US005230766A

United States Patent [19]

Kuper et al.

[11] Patent Number: 5,230,766

[45] Date of Patent: Jul. 27, 1993

[54] APPARATUS FOR JOINING VENEERS

[75] Inventors: Hans H. Kuper; Theo Gronebaum, both of Rietborg, Fed. Rep. of Germany

[73] Assignee: Heinrich Kuper GmbH & Co. KG, Reitberg, Fed. Rep. of Germany

[21] Appl. No.: 500,387

[22] Filed: Mar. 27, 1990

[30] Foreign Application Priority Data

Mar. 28, 1989 [DE] Fed. Rep. of Germany ... 8903793[U]

[51] Int. Cl.[5] .............. B32B 31/04

[52] U.S. Cl. .............. 156/544; 156/157; 156/304.1

[58] Field of Search .............. 156/157, 158, 159, 257, 156/304.1, 304.7, 304.5, 502, 503, 504, 505, 507, 509, 544, 545, 546; 29/113.1

[56] References Cited

U.S. PATENT DOCUMENTS

| | | | |
|---|---|---|---|
| 2,504,673 | 4/1950 | Fischer-Schmutz | 156/546 |
| 2,739,628 | 3/1956 | Kok | 156/362 |
| 3,253,323 | 5/1966 | Saueressig | 29/113.1 |
| 3,558,398 | 1/1971 | Ortel | 156/546 |
| 4,099,487 | 7/1978 | Wouters | 118/651 |
| 4,619,728 | 10/1986 | Brink | 156/555 |
| 4,856,154 | 8/1989 | Nikulainen et al. | 29/113.1 |
| 4,856,157 | 8/1989 | Küsters | 29/113.2 |
| 4,946,011 | 8/1990 | Oeynhausen et al. | 192/76 |

FOREIGN PATENT DOCUMENTS

| | | |
|---|---|---|
| 3409178 | 11/1984 | Fed. Rep. of Germany . |
| 1388085 | 12/1963 | France . |

*Primary Examiner*—David A. Simmons
*Assistant Examiner*—J. Sells
*Attorney, Agent, or Firm*—Spensley Horn Jubas & Lubitz

[57] ABSTRACT

The invention relates to an apparatus for joining veneers, comprising a plurality of driven transporting rolls arranged along one axis, at least one counterpressure roll arranged parallel thereto, as well as heating means and pressing means. In order to achieve a simple construction and reliable operability the apparatus according to the present invention comprises a jacket of the transporting and pressing roll which is frictionally connected to a drive shaft by means of a slip clutch. This construction furthermore ensures the transportation and alignment of even very thin veneers with uneven longitudinal edges in such a way that the longitudinal edges can be aligned in a desired gluing direction in a direction transverse to the passage direction.

29 Claims, 4 Drawing Sheets

APPARATUS FOR JOINING VENEERS

BACKGROUND OF THE INVENTION

1. Field of an embodiment of the Invention

The present invention relates to an apparatus which is used for joining veneers and comprises a plurality of transporting rolls arranged along one axis, and at least one counterpressure roll arranged parallel thereto, as well as heating means and pressing means.

2. Description of the Prior Art

An apparatus of the above-mentioned type is e.g. known from German patent specification 34 09 178. Apparatuses of this type serve to glue individual veneers or veneer sheet strips to one another over the longitudinal side so as to obtain a large veneer sheet. Since the veneer workpieces, which are to be processed later, are large, but very thin sheets, the respective individual veneers must be placed exactly against one another prior to the gluing operation. The edges to be glued must therefore be positioned exactly relative to each other over the entire length thereof. It is known from the prior art that a stop to which the individual veneer strips are respectively supplied is used for this purpose. Especially with wavy veneer strips or veneer strips that are supplied at an angle to the gluing direction, the positioning of the veneers is very difficult and often entirely impossible with the known machines.

SUMMARY OF THE INVENTION

It is the object of the invention to provide an apparatus which is used for joining veneers and comprises a plurality of transporting rolls arranged along one axis, and at least one counterpressure roll arranged parallel thereto, as well as heating means and pressing means and which, being of a simple construction and reliable operability, ensures the transportation and alignment of even very thin veneers with uneven longitudinal edges in such a way that the longitudinal edges can be aligned in a desired gluing direction in a direction transverse to the passage direction.

With an apparatus which is used for joining veneers and comprises a plurality of transporting rolls arranged along one axis, and at least one counterpressure roll arranged parallel thereto, as well as heating means and pressing means, this object of an embodiment of the invention is attained by the measure that the jacket of the transporting and pressing roll is frictionally connected to an inner and/or outer drive shaft by means of a slip clutch.

The apparatus according to embodiment of the invention has a number of considerable advantages. Since the diameter of an inner drive means can be varied, it is possible, on the one hand, to vary the contact pressure against the preceding veneer sheets in the glue joint in accordance with the respective requirements and, on the other hand, to vary this contact pressure when veneers of changing thickness or different coefficients of friction are to be processed. Moreover, the possibility of changing the diameter and of allowing slippage, e.g. by means of a slip clutch, results—according to the invention—in different conveying speeds and paths, respectively, of the individual areas of the veneer or the veneer sheet, so that veneers which have been introduced obliquely or askew can be aligned in an especially easy way. In contrast to the prior art, there is no risk that leading portions of the veneer are pressed against a stop or the trailing edge of the preceding veneer and damaged thereby, as the adhesive edge of the veneer can be aligned by the transporting and pressing rolls. An embodiment of the invention offers the special advantage that the rotational speed of the shaft carrying these transporting rolls need not be varied, so that complicated control operations can be dispensed with. The frictional force of the inner means can be changed differently by simply varying the pressurized fluid pressure, so that different conveying speeds can be achieved through a single drive on the individual portions of the apparatus.

In an especially advantageous development of an embodiment of the invention this transporting and pressing roll is enclosed by an outer jacket which is made from an elastic material and held by means of a cylindrical support body inserted into the transporting and pressing roll.

In one embodiment of the invention the transporting and pressing roll may be constructed such that the same preferably accommodates a support cylinder with a centrical recess for passing a shaft therethrough, and that at least one portion of the support cylinder has formed therein a recess for transmitting the pressure of the pressurized fluid to a preferably curved pressure plate acting on the jacket from the inside.

In order to distribute the supplied pressurized fluid uniformly over the respective length of the transporting and pressing roll and to subject the jacket evenly to a frictional force, another, very advantageous embodiment of the invention suggests that in the area of the recess the support cylinder should accommodate an inner elastic hose whose inner wall can be acted upon by the pressurized fluid. Hence, the hose is used, on the one hand, for sealing purposes and, on the other hand, for evenly transmitting the pressure exerted by the pressurized fluid.

According to a particularly preferred development of the invention the hose only extends over a part of the length of the support cylinder. This offers the possibility of arranging a plurality of such hose sections on a transporting and pressing roll and of applying pressure to each of these sections separately, so that different contact pressures and different circumferential speeds can be attained even if only one single transporting and pressing roll is used, with the roll being either continuous or divided into sections. As a consequence, the invention is also useful for individual transporting and pressing rolls of any arbitrary length. Hence, the invention makes it possible to align and exactly position veneers having relatively short gluing portions.

In embodiment of the invention the pressurized fluid is preferably supplied through the shaft. It has been found to be advantageous when the shaft comprises at least one centrical recess for passing pressurized fluid therethrough, said recess communicating with at least one radial recess of the shaft which terminates in the space between the respective hose section and the shaft.

With the apparatus according to embodiments of the invention the longitudinal edges which are to be glued and pertain to the individual veneers or veneer sheets can thus be aligned exactly relative to each other, in particular in one line in a direction transverse to the transportation direction. And this is possible with both straight and wavy or serrated joining portions of veneers. Hence, veneer sheets with even or notched cutting edges can be exactly and reliably positioned and joined to each other by virtue of the invention.

DESCRIPTION OF THE DRAWINGS

Embodiment of the present invention shall now be described with the help of an embodiment with reference to the accompanying drawing in which.

Figure 1:
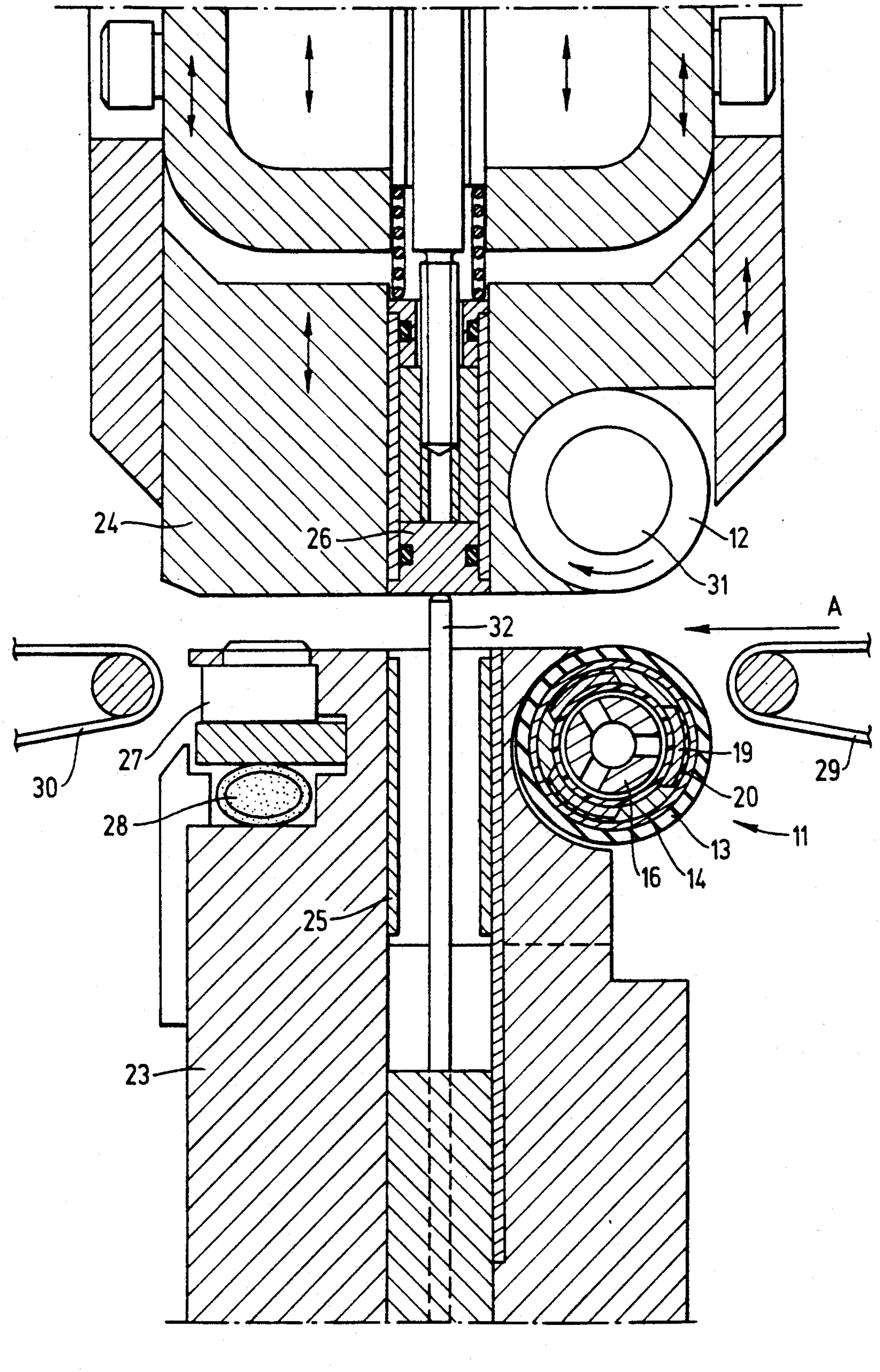
FIG. 1 is a partial sectional side view of the working area of an apparatus according to an embodiment of the invention for joining veneers.

Apart from the usual means which are e.g. known from the apparatus shown in German patent specification 26 14 216, which is herewith referred to, an apparatus of the invention comprises a stationary table (23) and an upper contact pressure pad (24). At the lead-in side A a counterpressure roll (12) is supported in/on the upper contact pressure pad (24), and a transporting and pressing roll (11) in the lower table (23). The contact pressure pad (24) is movable in the vertical direction so as to convey or clamp a veneer introduced in the transportation direction A.

In the center portion the table (23) and the contact pressure pad (24) respectively comprise a heating means (25, 26). These heating means are also vertically and relatively movable, either alone or together, so that in the seam portion of the veneers the same can be brought into contact with a veneer sheet (not shown) to carry out gluing by means of pressure and heat.

Brake pads (27) which can be operated via a pressure means (28) to hold or brake the incoming veneer are moreover supported in the lead-out portion of the table (23).

A lead-in conveyor (29) by which the veneer strips to be glued are supplied terminates at the lead-in side A of the table (23). By analogy, the lead-out side of the table (23) is followed by a lead-out conveyor (30) for transporting the veneer sheets glued to one another.

The counterpressure roll (12) is supported on a shaft (31) and connected thereto through a toothing, or the like. The shaft (31) is connected to a drive (not shown), so that the same can be rotated forcibly and clockwise, as shown.

The transporting and pressing roll (11) is supported on the table (23) and is also driven by means of a drive (not shown).

The apparatus of the invention for joining veneers operates in the usual way.

In the left area of the apparatus shown in FIG. 1 a broad glued veneer sheet is held by means of the brake pads (27). Additional stop pins (32) which are supported on the table (23) can here be moved upwards to exactly position the veneer sheet and its trailing edge, respectively. A veneer which, after the stop elements (32) have been removed from the transportation path, is brought into contact with the already present veneer sheet is subsequently supplied by the lead-in conveyor (29) and the transporting and pressing roll (11). At the same time, the upper pressure pad (24) is moved downwards to press the incoming veneer and the preceding veneer sheets, the preceding veneer being fixedly clamped by the brake pad (27), and the heating means (25, 26) forming a passageway when a slight spring pressure is exerted on the veneers and the subsequent veneer sheet, respectively. In this passageway the subsequent veneer is firmly pressed by transporting and pressing roll (11) and counterpressure rolls (12) against the preceding veneer sheet. In addition, the upper and lower heating means (25, 26) are activated with pressure and heat to spread the adhesive which has been applied during the supply of the new veneer to the adhesive edge thereof, over the other veneer sheet. The necessary contact pressure between the veneers is produced and maintained by the transporting and pressing roll (11) and the associated counterpressure roll (12). After a predetermined reaction time the joined veneer sheets are released and transported away.

Figure 2:
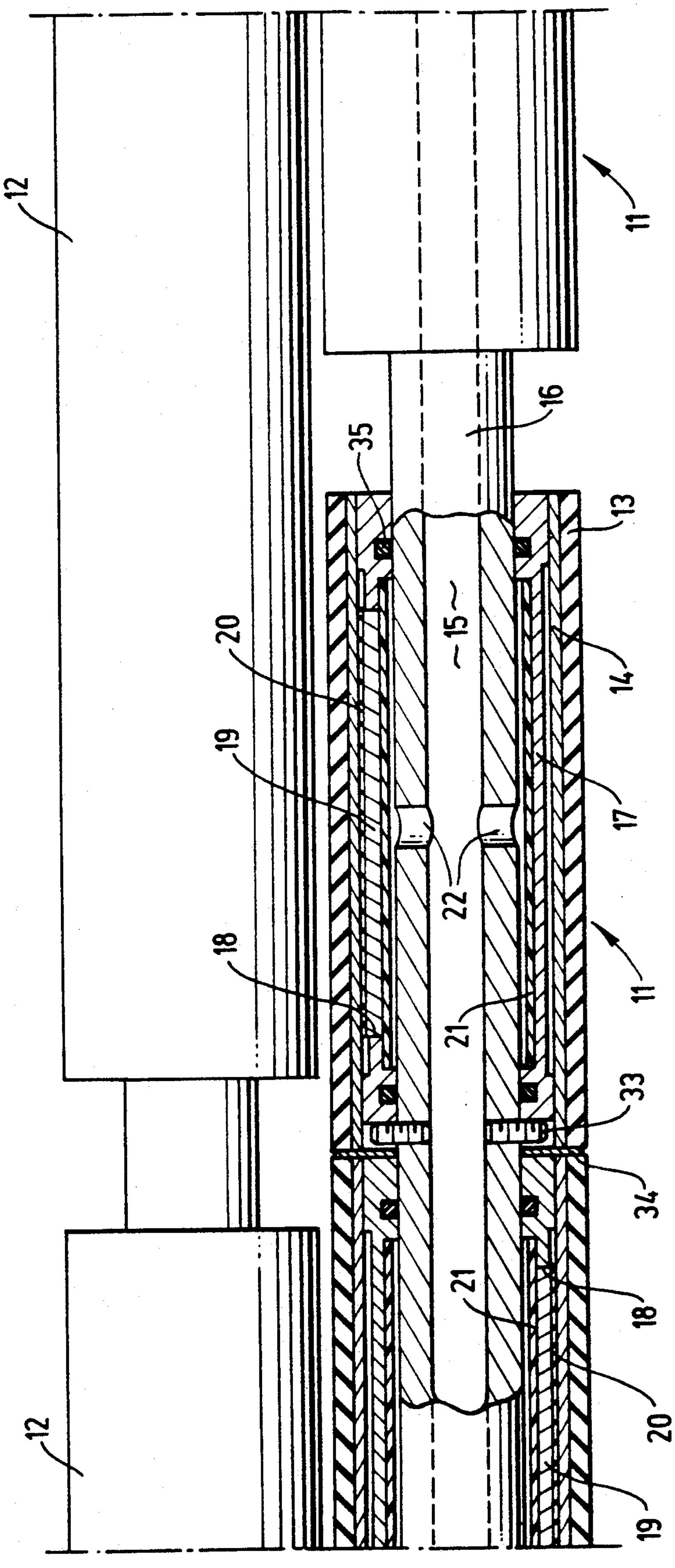
FIG. 2 a longitudinal section through a transporting and pressing roll according to an embodiment of the invention and a side view of a counterpressure roll.
Figure 3:
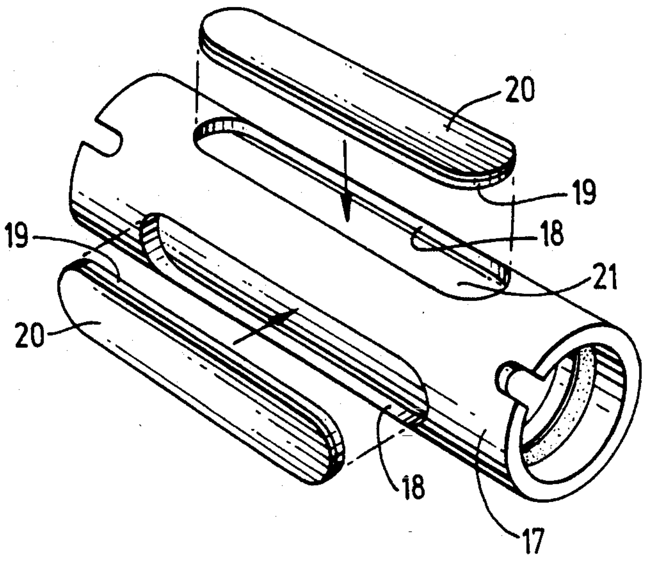
FIG. 3 a perspective (exploded) view of a support cylinder comprising pressure plates.
Figure 4:
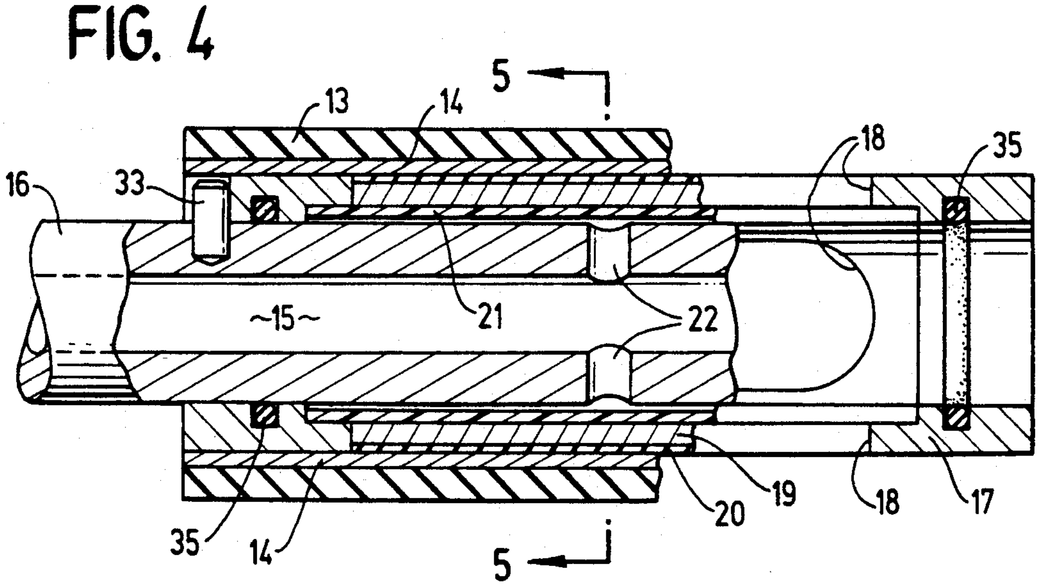
FIG. 4 a partial and enlarged longitudinal section through a transporting and pressing roll according to an embodiment of the invention according to FIG. 2.

FIG. 2 is a side view of the transporting and pressing roll (11) and the associated driven counterpressure roll (12). The counterpressure roll (12) is constructed in the normal way, so that a detailed description is not necessary.

The transporting and pressing roll (11) of the invention is composed of individual roll sections which respectively comprise an outer jacket (13) which is shaped in the form of a cylindrical jacket and consists of a coarse material, such as hard rubber. This jacket (13) is supported by an inner support body (14) which consists of a metal and is also shaped like a cylindrical jacket and comprises a centrical bore through which a support cylinder (17) with an inner shaft (16) is passed. This shaft (16) is connected to a lateral drive (not shown) and comprises an inner bore (15) through which a pressure medium, such as compressed air, can be supplied.

The outer circumference of the jacket (13) has a high coefficient of friction so as to reliably ensure the transportation and pressing of a veneer.

A support cylinder (17) which in its central longitudinal portion has a plurality of parallel-extending oblong recesses (18) distributed over its circumference is supported inside each support body (14) which forms only one respective short roll (50–100 mm) with the jacket (13). These recesses have rounded end portions comprising smooth wall surfaces inclined from the outside to the inside.

A curved removable pressure plate (19) which comprises an outer covering (20) consisting of a material, such as hard rubber, with a high coefficient of friction is respectively supported in these recesses (18). This outer covering (20) of the pressure plate (19) rests on the smooth support body (14) of the jacket (13) and its friction surface has the function to carry along the jacket (13) at the same rotational speed, or to allow a relative movement under slippage and contact pressure if a lower rotational speed is imparted to the jacket (13) due to the fact that a veneer carried along by the jacket (13) strikes against an obstacle (such as the edge of a preceding veneer sheet).

The frictional force occurring between the outer friction surface of the covering (20) of the pressure plate (19) and the surrounding smooth inner wall of the cylindrical support body (14) is controlled by the elastic wall of a hose (21) which inside all adjacent support cylinders (17) is inserted in sections and subjected to the pressure of a pressure medium, preferably compressed air.

Figure 5:
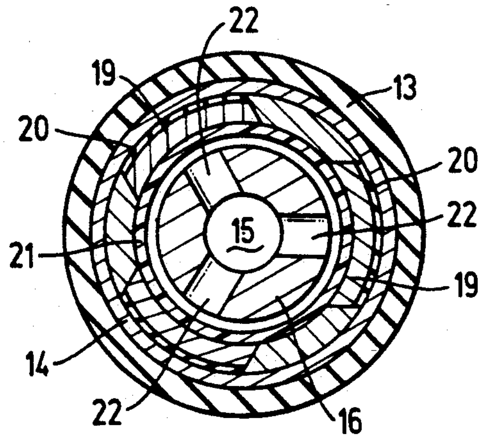
FIG. 5 a cross section through the same transporting and pressing roll of FIG. 4 according to section line 5—5.
Figure 6:
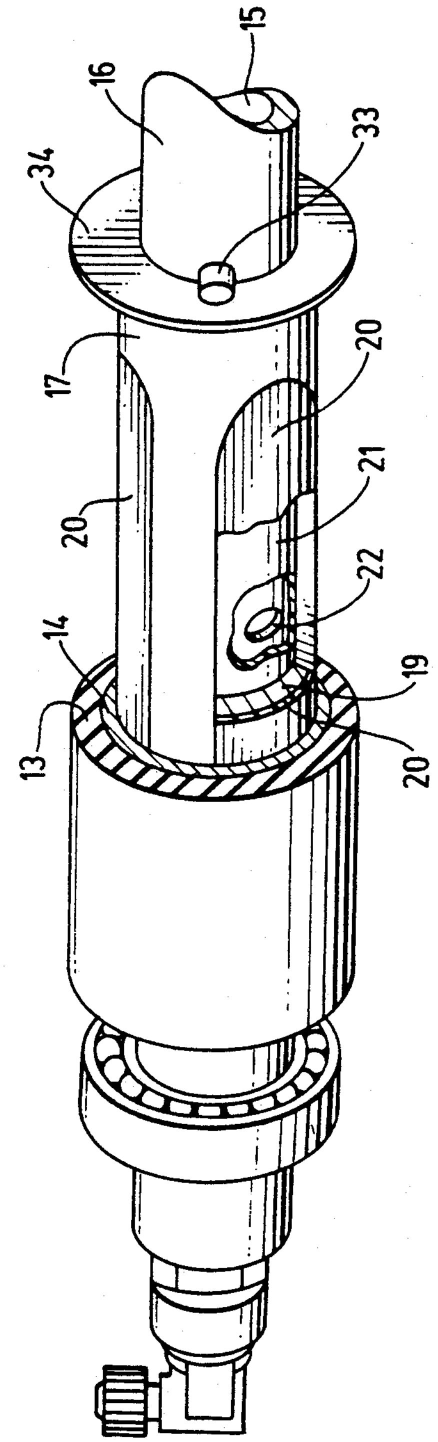
FIG. 6 a perspective view of a part of the transporting and pressing roll with a partial section through the inner drive means including support cylinder, hose and pressure plate of FIG. 3 and a shaft.

This elastic hose (21) which in individual sections extends over the whole length of the shaft (16) or preferably almost exclusively over the length of a support cylinder (17) consists e.g. of a plastic material and is fully acted upon on its inner side by a pressure medium which is supplied to the hose (21) through a centrical longitudinal bore (15) in the shaft (16) via the radial transverse channels (22) (see FIG. 5) and has a static effect. In the area of each recess (18) of the support cylinder (17) the pressure medium presses the resilient hose (21) into this recess (18) in such a way that the small exposed pressure plate (19) moves outwards and presses with is covering (20) against the inner wall of the cylindrical support body (14). As a result, a more or less great frictional force is built up there in response to the respective pressure of the pressure medium (e.g. 3-6 bar).

Since a plurality of recesses (18) are evenly (i.e. at the same distance) distributed over the circumference of each support cylinder (17), an identical frictional force is produced on the inner wall of the support body (14) on several surfaces on the same distance.

When a veneer traveling along the upper vertex line of the jacket (13) of the transporting and pressing roll (11) strikes against a preceding veneer sheet (at the left side in FIG. 1) and has a bent protruding longitudinal edge, this protruding bent part of the longitudinal edge is not conveyed further by reason of the counterpressure and thus the relative movement between jacket (13) and shaft (16), whereas adjacent parts of the longitudinal edge to be glued —these parts do not touch the preceding veneer sheet yet—are further transported until the entire longitudinal edge is positioned along one line (i.e. on the line of the longitudinal edge of the preceding veneer sheet) and can be exactly and congruently glued to the rear longitudinal edge of the preceding veneer sheet. For this purpose the contact pressure pad (24) moves downwards and presses the previously correctly positioned longitudinal edges together with heating of the butt-glued adhesive.

Radial grub screws (33) are used for the positive connection between the shaft (16) and the respective support cylinder (17).

Spacer rings (3) which are respectively supported on the shaft (16) protrude between two transporting and pressing rolls (11). These spacer rings prevent jacket (13) and the support body (14), respectively, from reciprocating on the adjacent support cylinders (17) which, when being separated from one another, are each of the same length as the jacket (13).

As shown in FIG. 2, individual sections of the hose (21) extend almost over the length of each support cylinder (17), and the compressed-air chambers are laterally sealed by means of annular seals (35).

We claim:

1. An apparatus for joining veneers, comprising:
a plurality of driven transporting and pressing rolls arranged along one axis;
at least one counterpressure roll arranged parallel thereto;
heating means; and
pressing means;
characterized in that the apparatus further comprises:
a plurality of slip clutches, each respective slip clutch being associated with a respective transporting and pressing roll; and
a drive shaft;
wherein each of said transporting and pressing rolls includes a jacket frictionally connected to the drive shaft by means of its associated slip clutch; and
wherein each slip clutch comprising a support cylinder disposed between the drive shaft and an inner support body of said jacket, said support cylinder being provided with recesses each of which having positioned therein a radially movable pressure plate, subjected to the presence of a pressure medium.

2. The apparatus according to claim 1, characterized in that said drive shaft is arranged inside said jacket.

3. The apparatus according to claim 1, characterized in that said drive shaft is arranged outside said jacket.

4. The apparatus according to claim 1, characterized in that said jacket of said transporting and pressing roll is provided with an outer harder material layer which has a certain coefficient of friction and is supported on an inner cylindrical support body which is attached thereto and consist of metal, or the like.

5. The apparatus according to claim 1 characterized in that said jacket is freely rotatably supported together with said support body on said support cylinder.

6. The apparatus according to claim 1 characterized in that said pressure plate is curved outwardly.

7. The apparatus according to claim 1 characterized in that said pressure plate comprises an outer friction layer and an inner support layer.

8. The apparatus according to claim 1, characterized in that said transporting and pressing roll is composed of a plurality of adjacently arranged individual rolls which are separated from one another by means of spacer rings supported on said drive shaft.

9. The apparatus according to claim 1, characterized in that a plurality of parallel longitudinal recesses are arranged on the circumference of said support cylinder, said recesses being spaced apart from one another at the same distance.

10. The apparatus according to claim 1, characterized in that said longitudinal recesses of said support cylinder are provided with outwardly opening inclined wall surfaces.

11. The apparatus according to claim 1, characterized in that said pressure plates are provided with lateral wall surfaces of the same inclination as the wall surfaces of said longitudinal recesses.

12. The apparatus according to claim 1, characterized in that each of said removable pressure plates has an outer covering as a friction layer which is made from a material, such as hard rubber, having a high coefficient of friction.

13. An apparatus according to claim 1, wherein an elastic hose is fastened to an inner side of said support cylinder for sealing said recesses, said elastic hose being subjected to the pressure of said pressure medium and cooperating with said pressure plates.

14. The apparatus according to claim 13, characterized in that said drive shaft is provided with a central longitudinal bore and radial supply bores which are branched therefrom and terminate in a space between the surface of said drive shaft and said elastic hose.

15. The apparatus according to claim 13, characterized in that the spaces between the sections of said hose are laterally sealed relative to each other in pressure medium-tight fashion towards the surface of said drive shaft.

16. The apparatus according to claim 13, characterized in that each section of said hose extends over the center portion of a roll section.

17. The apparatus according to claim 1, wherein each slip clutch further comprises means for selectively frictionally connecting the jacket of its associated transporting and pressing roll to the drive shaft so as to rotate at least one of the transporting and pressing rolls at a rotational speed different from the rotational speed of at least one other of the transporting and pressing rolls.

18. An apparatus for joining veneers, comprising:

a plurality of rotatable transporting and pressing rolls having a common axis;

at least one counterpressure roll having an axis substantially parallel to the common axis of the transporting and pressing rolls;

a plurality of slip clutch devices, each respective slip clutch device being associated with a respective transporting and pressing roll; and a drive shaft;

wherein each of said transporting and pressing rolls has a jacket frictionally connected to the drive shaft by its associated slip clutch device; and each slip clutch device comprising a support cylinder disposed between the drive shaft and the jacket, the support cylinder being provided with plural recesses, the slip clutch further comprising a movable pressure plate arranged in each recess.

19. The apparatus according to claim 18, wherein the slip clutch further comprises a pressure medium transferring system operatively connected to the movable pressure plate for communicating pressure to control movement of the pressure plate.

20. The apparatus according to claim 18, wherein the pressure plate is movable in the radial direction with respect to the support cylinder and wherein the jacket has an inner support body defining an inner surface against which the movable pressure plates frictionally engage when moved radially away from the axis of the support cylinder.

21. An apparatus according to claim 18, wherein the slip clutch further comprises an elastic hose fastened to the support cylinder adjacent each recess, and a pressure medium communication system for communicating fluid pressure into the hose, the hose being operatively connected to the pressure plate so as to communicate pressure from the pressure medium communication system to the pressure plate.

22. The apparatus according to claim 21, wherein the pressure plate is movable in the radial direction with respect to the support cylinder in response to a suitable pressure being communicated thereto through the pressure medium communication system and the elastic hose and wherein the jacket has an inner support body defining an inner surface against which the movable pressure plates frictionally engage when moved radially away from the axis of the support cylinder.

23. The apparatus according to claim 18, wherein each slip clutch further comprises means for selectively frictionally connecting the jacket of its associated transporting and pressing roll to the drive shaft so as to rotate at least one of the transporting and pressing rolls at a rotational speed different from the rotational speed of at least one other of the transporting and pressing rolls.

24. An apparatus for joining veneers, comprising:

a drive shaft;

a plurality of rotatable transporting and pressing rolls supported by the drive shaft, each of said transporting and pressing rolls having an outer jacket for contacting a veneer;

clutch means for selectively frictionally connecting the jacket of each transporting and pressing roll to the drive shaft so as to rotate at least one of the transporting and pressing rolls at a rotational speed different from the rotation speed of at least one other of the transporting and pressing rolls.

25. The apparatus according to claim 24, wherein the clutch means comprises a support cylinder disposed between the drive shaft and the jacket, the support cylinder being provided with plural recesses, the clutch means further comprising a movable pressure plate arranged in each recess.

26. An apparatus for joining veneers, comprising:

a plurality of driven transporting and pressing rolls arranged along one axis;

at least one counterpressure roll arranged parallel thereto;

heating means; and pressing means;

characterized in that:

each of said transporting and pressing rolls includes a jacket frictionally connected to a drive shaft by means of a slip clutch; and said slip clutch comprising a support cylinder disposed between the drive shaft and an inner support body of said jacket, said support cylinder being provided with recesses each of which having positioned therein a radially movable pressure plate, subjected to the pressure of a pressure medium;

wherein said jacket of said transporting and pressing roll is provided with an outer harder material layer which has a certain coefficient of friction and is supported on an inner cylindrical support body which is attached thereto and consists of metal, or the like.

27. An apparatus for joining veneers, comprising:

a plurality of driven transporting and pressing rolls arranged along one axis;

at least one counterpressure roll arranged parallel thereto;

heating means; and pressing means;

characterized in that:

each of said transporting and pressing rolls includes a jacket frictionally connected to a drive shaft by means of a slip clutch; and said slip clutch comprising a support cylinder disposed between the drive shaft and an inner support body of said jacket, said support cylinder being provided with recesses each of which having positioned therein a radially movable pressure plate, subjected to the pressure of a pressure medium;

wherein said transporting and pressing roll is composed of a plurality of adjacently arranged individual rolls which are separated from one another by means of spacer rings supported on said drive shaft.

28. An apparatus for joining veneers, comprising:

a plurality of driven transporting and pressing rolls arranged along one axis;

at least one counterpressure roll arranged parallel thereto;

heating means; and pressing means;

characterized in that:

each of said transporting and pressing rolls includes a jacket frictionally connected to a drive shaft by means of a slip clutch; and said slip clutch comprising a support cylinder disposed between the drive shaft and an inner support body of said jacket, said support cylinder being provided with recesses each of which having positioned therein a radially movable pressure plate, subjected to the pressure of a pressure medium;

wherein an elastic hose is fastened to an inner side of said support cylinder for sealing said openings, said elastic hose being subjected to the pressure of said pressure medium and cooperating with said pressure plates.

29. An apparatus for joining veneers, comprising:

a plurality of rotatable transporting and pressing rolls having a common axis;

at least one counterpressure roll having an axis substantially parallel to the common axis of the transporting and pressing rolls;

each of said transporting and pressing rolls having a drive shaft, a slip clutch and a jacket frictionally connected to the drive shaft by the slip clutch; and the slip clutch comprising a support cylinder disposed between the drive shaft and the jacket, the support cylinder being provided with plural recesses, the slip clutch further comprising a movable pressure plate arranged in each recess;

wherein the slip clutch further comprises an elastic hose fastened to the support cylinder adjacent each recess, and a pressure medium communication system for communicating fluid pressure into the hose, the hose being operatively connected to the pressure plate so as to communicate pressure from the pressure medium communication system to the pressure plate.

* * * * *

UNITED STATES PATENT AND TRADEMARK OFFICE

CERTIFICATE OF CORRECTION

PATENT NO. : 5,230,766

DATED : July 27, 1993

INVENTOR(S) : Hans H. Kuper et al.

It is certified that error appears in the above-indentified patent and that said Letters Patent is hereby corrected as shown below:

On the title page, item [75], delete "Rietborg" and substitute --Rietberg--.

On the title page, item [73], delete "Reitberg", and substitute --Rietberg--.

Signed and Sealed this

Tenth Day of May, 1994

Attest:

BRUCE LEHMAN

*Attesting Officer* *Commissioner of Patents and Trademarks*